United States Patent [19]
Klein

[11] Patent Number: 5,935,226
[45] Date of Patent: Aug. 10, 1999

[54] METHOD AND APPARATUS FOR ISSUING TRANSACTION REQUESTS TO A TARGET DEVICE IN ACCORDANCE WITH THE STATE OF CONNECTION BETWEEN THE PORTABLE COMPUTER AND THE TARGET DEVICE

[75] Inventor: Dean A. Klein, Eagle, Id.

[73] Assignee: Micron Electronics, Inc., Nampa, Id.

[21] Appl. No.: 08/822,334

[22] Filed: Mar. 20, 1997

[51] Int. Cl.[6] .............................. G06F 13/00; G06F 13/38
[52] U.S. Cl. ........................................... 710/101; 710/129
[58] Field of Search .................................... 395/280–283, 395/306–309; 361/683–686

[56] References Cited

U.S. PATENT DOCUMENTS

| | | | |
|---|---|---|---|
| 5,436,857 | 7/1995 | Nelson et al. | 364/708.1 |
| 5,454,084 | 9/1995 | Uchikoga | 395/281 |
| 5,555,430 | 9/1996 | Gephardt et al. | 395/800.16 |
| 5,566,349 | 10/1996 | Trout | 395/840 |
| 5,579,528 | 11/1996 | Register | 395/671 |
| 5,584,029 | 12/1996 | Izui et al. | 395/750.01 |
| 5,590,376 | 12/1996 | Kou | 395/839 |
| 5,598,537 | 1/1997 | Swanstrom et al. | 395/281 |
| 5,598,539 | 1/1997 | Gephardt et al. | 395/281 |
| 5,636,347 | 6/1997 | Muchnick et al. | 395/283 |
| 5,781,748 | 7/1998 | Santos et al. | 395/308 |

OTHER PUBLICATIONS

MindShare, Inc., Anderson and Shanley, "Pentium™ Processor System Architecture," Second Edition, *PC System Architecture Series*:126–132, 221–234, 1995.

*Primary Examiner*—Ayaz R. Sheikh
*Assistant Examiner*—Sumati Lefkowitz
*Attorney, Agent, or Firm*—Seed and Berry LLP

[57] ABSTRACT

A computer system includes a portable computing unit releasably coupled to a docking unit to which a target device is also coupled. The portable computing unit includes a detector that detects whether the portable computing unit currently is coupled to the docking unit and, if not, transmits an undocked signal indicating that the portable computing unit is not coupled to the docking unit. The portable computing unit also includes a processor that is structured to issue a request for access to the target device and a bridge that is structured to store an indication of whether the target device is coupled to the docking unit. The bridge uses the stored indication and the undocked signal to determine whether the target device currently is coupled to the bridge and, if the target device is not currently coupled to the bridge, terminates the transaction request and transmits to the processor an error signal indicating that the target device is not currently coupled to the bridge.

43 Claims, 4 Drawing Sheets

METHOD AND APPARATUS FOR ISSUING TRANSACTION REQUESTS TO A TARGET DEVICE IN ACCORDANCE WITH THE STATE OF CONNECTION BETWEEN THE PORTABLE COMPUTER AND THE TARGET DEVICE

TECHNICAL FIELD

The present invention relates to portable computing systems, and more particularly, to a docking station interfacing with a portable computer.

BACKGROUND OF THE INVENTION

Many computer users find portable or mobile computers, such as laptop, notebook, and palmtop computers, to be more convenient than traditional desktop computers. In particular, such portable computers can be carried easily to enable them to be used substantially wherever the user desires. However, the limited size of such portable computers creates disadvantages compared to traditional desktop models. For example, portable computers typically employ relatively small keyboards and display screens. In addition, most portable computers do not have many of the accessories associated with desktop computers, such as CD ROM drives, network connections, and fax/modems.

To compensate for some of the drawbacks of portable computers, many portable computers now come equipped with docking units. A docking unit allows a portable computer to be connected to computer accessories that are too large or too inconvenient to be permanently coupled to the portable computer. For example, a fill-size keyboard and display monitor typically are coupled to such docking units to enable users to interface more conveniently with the portable computer. In addition, such docking units typically may be coupled to a network such as the Internet or a local area network (LAN).

A prior art computing system 10 with a portable computing unit 12 coupled to a docking unit 14 is shown in FIG. 1. As is typical the portable computing unit 12 includes a processor 16 coupled by a processor bus 18 to a dynamic random access memory (DRAM) unit 20 and a static random access memory (SRAM) cache 22. A bridge/control unit 24, referred to as a North bridge, couples a Peripheral Component Interconnect (PCI) bus 26 to the processor bus 18. Coupled to the PCI bus 26 are a video controller/display screen 28 and a South bridge 30 that couples an internal industry standard architecture (ISA) bus 32 to the PCI bus 26. Coupled to the internal ISA bus 32 are a hard drive 34 and an input device 36, such as a keyboard, mouse, and/or electronic pen. The docking unit 14 includes an external ISA bus 38 that is releasably coupled to the internal ISA bus 32 of the portable computing unit 12. Coupled to the external ISA bus 38 are a LAN connection 40 and a fax/modem 42.

When the processor 16 issues a transaction request for one of the component devices 34, 36 coupled to the internal ISA bus 32 or one of the component devices 40, 42 coupled to the external ISA bus 38, the transaction request is transmitted via the processor bus 18 and the North bridge 24 to the PCI bus 26. The South bridge 30 can claim the transaction request according to a method known as "subtractive decoding" and transmit the claimed transaction request on the internal ISA bus 32 to the hard drive 34, input device 36, or external ISA bus 38. In subtractive decoding, the South bridge 30 waits a predetermined period (e.g., two clock cycles) after the transaction request is placed on the PCI bus 26 to allow any other PCI devices, such as the video controller/display screen 28, to claim the transaction request. When the transaction request is not claimed by any other PCI device within the predetermined period, the South bridge 30 asserts a device select signal DEVSEL# on the PCI bus 26 and passes the transaction request onto the internal ISA bus 32. The component device requested by the transaction request can claim the transaction request by sending appropriate control signals to the South bridge.

The subtractive decode method of the prior art works fine when the component requested by the transaction request is coupled to the internal ISA bus 32. However, in the computer system 10 shown in FIG. 1, the portable computing unit 12 can be detached from the docking unit 14 to allow the portable computing unit 12 to be transported as desired. In the prior art computing system 10, the processor 16 does not know immediately that the portable computing unit 12 has been detached from the docking unit 14. As a result, the processor 16 may continue to issue transaction requests for the LAN connection 40 or the fax/modem 42 even though the portable computing unit 12 is no longer attached to the docking unit 14.

When the processor 16 issues a transaction request for one of the components 40, 42 coupled to the docking unit 14, the transaction request is placed on the PCI bus 26 by the North bridge 24 as discussed above. The South bridge 30 will perform a subtractive decoding to claim the transaction request and will forward the transaction request on the internal ISA bus 32. Given that the portable computing unit 12 is not coupled to the docking unit 14, the transaction-request languishes on the internal ISA bus 32 because the requested component is not available. After a predetermined period, the South bridge 30 will recognize that it has not received a response from the requested component and will deassert the DEVSEL# control signal to indicate to the North bridge that the requested component is not available.

Waiting for an unavailable component to claim the transaction request from the internal ISA bus 32 slows processing speed because it takes a relatively long time (as long as 2.5 microseconds for a 32 bit access) for the South bridge 30 to time out while waiting for one of the components to claim the transaction request. To prevent any transaction request conflicts, the processor 16 is generally held idle for the entire time that the South bridge 30 is waiting for one of the components to claim the transaction request from the internal ISA bus 32. Although 2.5 microseconds may seem like a short time period, in terms of modem processor technology 2.5 microseconds is quite long. A state of the art microprocessor might well perform over several hundred instructions in that brief time period. Accordingly, such requests for access to components that are no longer coupled to the portable computing unit 12 cause unproductive and time consuming disruptions in the prior art computer system 10.

SUMMARY OF THE INVENTION

One embodiment of the present invention is directed to a computer system and method for servicing requests for access to unconnected computer system components. The computer system includes a docking unit coupled to a target device that performs a requested computer function in response to receiving a transaction request for access to the target device. The computer system also includes a portable computing unit releasably coupled to the docking unit. The portable computing unit includes a processor that is structured to issue a transaction request for access to the target device. The portable computing unit also includes a detector that detects whether the portable computing unit currently is coupled to the docking unit and transmits a docking status signal indicating whether the portable computing unit is coupled to the docking unit. Coupled to the processor and the detector is a bridge that is structured to store an indication of whether the target device is coupled to the docking unit. The bridge uses the stored indication and the docking status signal to determine whether the target device currently is coupled to the bridge. The bridge transmits to the processor a target status signal indicating whether the target device is currently coupled to the bridge.

In one embodiment, the target status signal includes a control signal that terminates the transaction being requested without waiting an extended period for an unavailable requested target device to respond. In addition, the bridge preferably sends a system management interrupt signal that causes the processor to stop normal execution and begin executing error handling instructions that are stored in a system management memory. In one embodiment, the error handling instructions cause the processor to reconfigure the operating system to remove references to the target device that has been removed from the system. Alternatively, the error handling instructions could emulate the target device such that the computer program that caused the processor to issue the transaction request can handle the error efficiently.

DETAILED DESCRIPTION OF THE INVENTION

Figure 1:
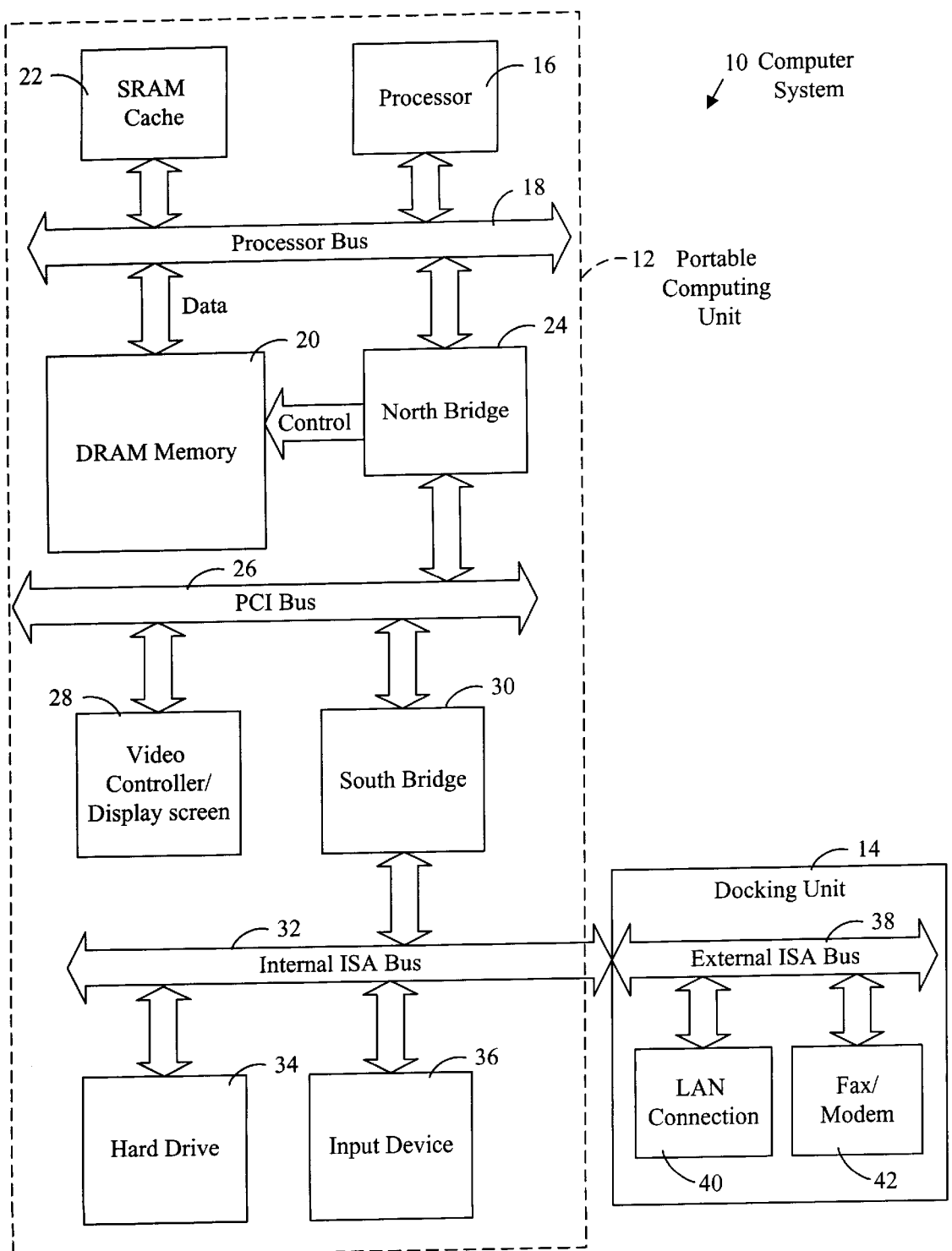
FIG. 1 is a block diagram of a prior art computer system.
Figure 2:
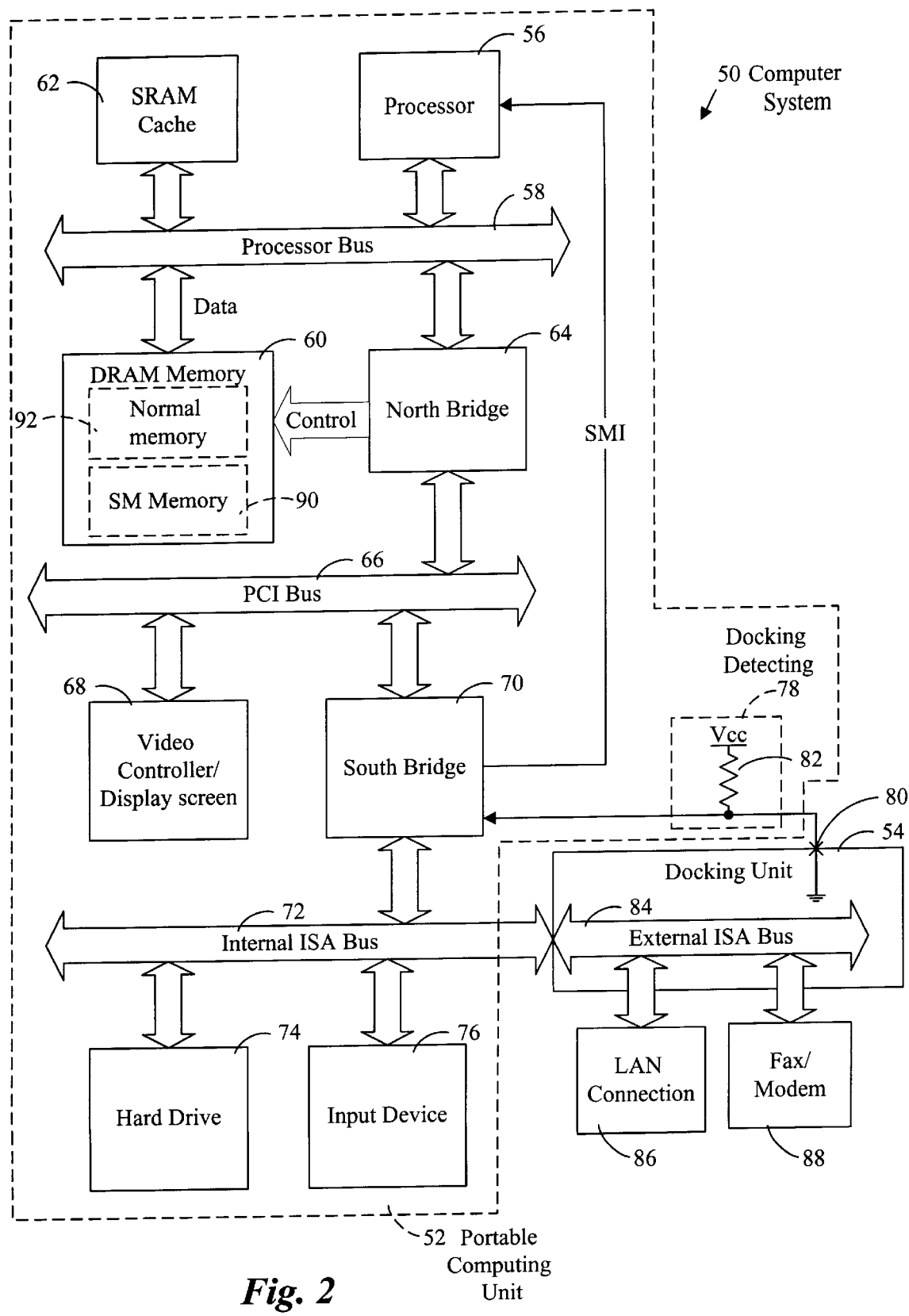
FIG. 2 is a block diagram of a computer system according to the present invention.

A computer system 50 for servicing component transaction requests is shown in FIG. 2. The computer system 50 includes a portable computing unit 52 releasably coupled to a docking unit 54. The portable computing unit 52 includes a processor 56 coupled by a processor bus 58 to a main memory unit 60 and a cache unit 62. The processor 56 can include any microprocessor, such as the Pentium™ or Pentium Pro™ Microprocessor from Intel Corp. or various microprocessors from other manufacturers. As is typical, the main memory is comprised of dynamic random access memory (DRAM) and stores software instructions and data that is used by the processor 56 to perform a specified function. The software instructions include application programs and an operating system, such as Microsoft Windows 95, that interfaces the application programs with the hardware of the computer system 50. The cache unit 62 may include static random access memory (SRAM) that stores frequently accessed instructions and data that can be accessed by the processor 56 more quickly than the instructions and data stored in the DRAM main memory unit 60.

Coupled to the processor bus 58 and the DRAM memory 60 is a North bridge 64. The North bridge 64 acts as a controller to control how information is written to and read from the DRAM memory 60. In addition, the North bridge 64 interfaces a Peripheral Component Interconnect (PCI) bus 66 to the processor bus 58.

Coupled to the PCI bus 66 are a video controller/display screen unit 68 and a South bridge 70. The South bridge 70 interfaces an internal ISA bus 72 to the PCI bus 66. Coupled to the internal ISA bus 72 are a hard drive 74 and an input device 76, such as a keyboard, mouse, and/or electronic pen.

The portable computing unit 52 also includes a docking detector 78 coupled to the South bridge 70 and releasably coupled to a grounded port 80 of the docking unit 54. The docking detector 78 detects whether the portable computing unit 52 is detached from the docking unit 54 and transmits a docking status signal to the South bridge 70. In the embodiment illustrated in FIG. 2, the docking status signal is an "undocked signal" indicating that the portable computing unit 52 is undocked. However, it will be understood that the docking status signal could alternatively be a "docked signal" indicating that the portable computing unit 52 is docked. In the embodiment shown in FIG. 2, the detector 78 includes a pull-up resistor 82 coupled between a docking status line connected to the South bridge 70 and a power source $V_{CC}$. When the portable computing unit 52 is attached to the docking unit 54, the docking status line is pulled low by the grounded port 80 of the docking unit 54. As a result, the docking detector 78 transmits an active low docked signal to the South bridge 70. When the portable computing unit 52 is detached from the docking unit 54, the pull-up resistor 82 pulls the docking status line high. As a result, the docking detector 78 transmits an active high undocked signal to the South bridge 70.

The docking unit 54 includes an external ISA bus 84 that is releasably coupled to the internal ISA bus 72 of the portable computing unit 52. For example, the ISA bus 84 may be coupled to the internal ISA bus 72 with a standard connector. Coupled to the external ISA bus 84 are a local area network (LAN) connection 86 and a fax/modem 88. The LAN connection 86 typically will be implemented using an Ethernet card, but various other known LAN connections can be employed. In addition to the LAN connection 86 and the fax/modem 88, numerous other computer components, such as a full size keyboard and a large video monitor, could be coupled to the external ISA bus 84 as desired. Further, the docking unit 54 could also include an external PCI bus that is releasably coupled to the PCI bus 66 to allow quicker access to computer components coupled to the docking unit 54.

When the processor 56 is instructed to write data to or read data from one of the component devices 86, 88 coupled to the docking unit 54, the processor 56 transmits a transaction request across the processor bus 58 to the North bridge 64. The North bridge 64 forwards the transaction request across the PCI bus 66 to the South bridge 70. If the portable computing unit 52 is currently attached to the docking unit 54, then the South bridge 70 places the transaction request on the internal ISA bus 72 and the external ISA bus 78. Whichever one of the component devices 86, 88 is requested by the transaction request will decode and perform the requested transaction, that is, return data for a read transaction request or accept write data for a write transaction request.

If the portable computing unit 52 is not currently attached to the docking unit 54, then the South bridge 70 will terminate the transaction request without issuing the ISA bus cycle on the internal ISA bus 72. In addition, the South bridge 70 may transmit a system management interrupt (SMI) signal to the processor 56 which causes the processor 56 to enter a system management mode. In the system management mode, the processor 56 accesses a system management handler program that resides in a system management memory portion 90 of the DRAM memory 60. The system management memory 90 is a portion of the DRAM memory 60 that is used by the processor 56 during normal application execution.

In the embodiment shown in FIG. 2, the system management handler stored in the system management memory 90 includes error handling instructions that cause the processor to appropriately respond to the detachment of the portable computing unit 52 from the docking unit 54. In one embodiment, the error handling instructions cause the operating system to remove references to the requested component device that is no longer attached to the portable computing unit 52. References to such a detached component device can be removed by various operating systems, such as Microsoft Windows 95 which removes such references by transmitting a WM_ Device Change message to all open application programs and to the software device driver for the requested component device. In an alternative embodiment, the error handling instructions emulate the requested components such that the application program that caused the processor to issue the transaction request can handle the error efficiently. For example, if requested component device is the LAN connection 86, then the error handling instructions could inform the application program that the network is unavailable so that the application program can withhold requests for the LAN connection 86 until the portable computing unit 52 is attached again to the docking unit 54.

Figure 3:
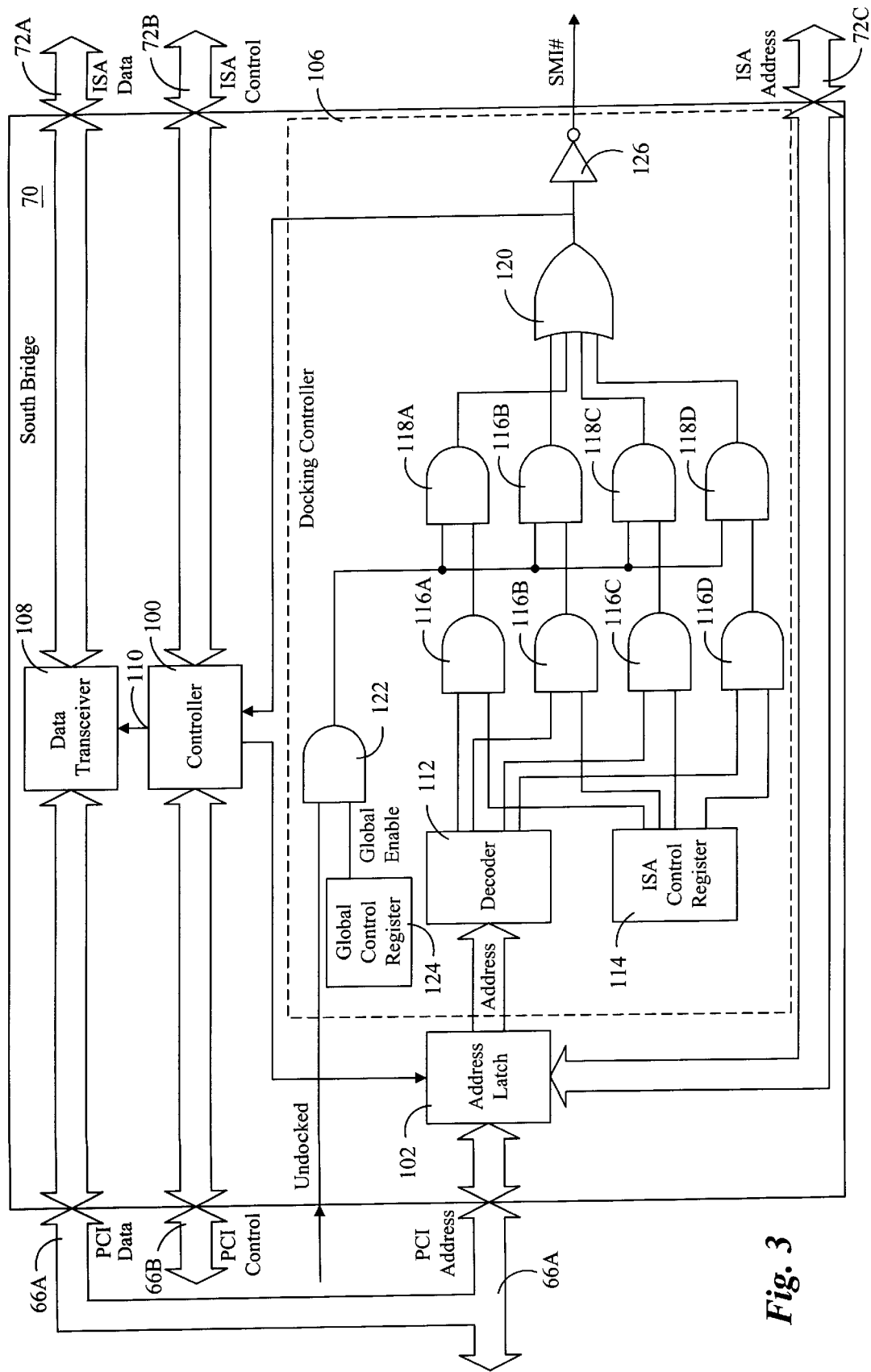
FIG. 3 is a block diagram of a South bridge used in the computer system shown in FIG. 2.
Figure 4:
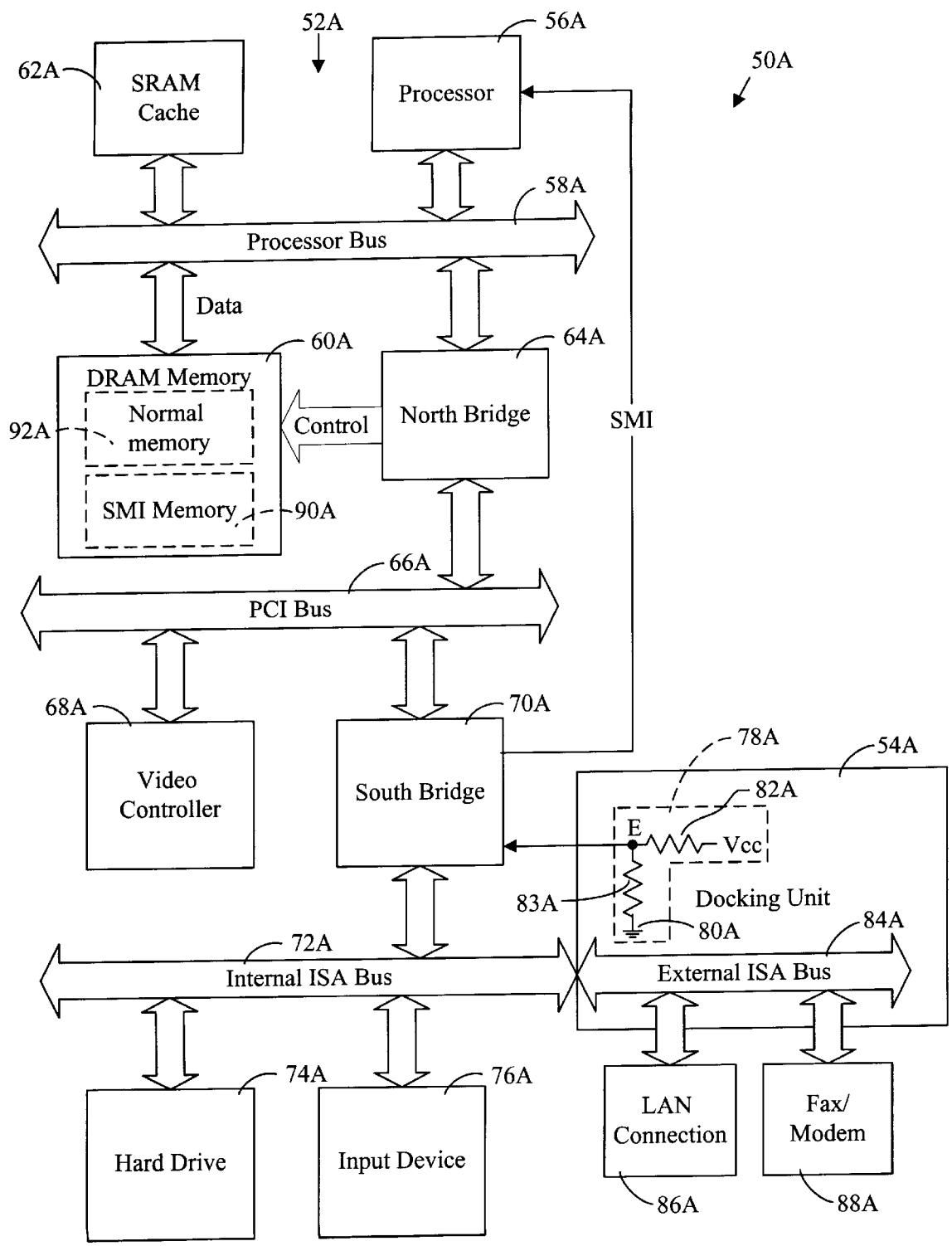

A schematic diagram of one embodiment of the South bridge 70 is shown in FIG. 3. The South bridge 70 communicates with the North bridge 64 via the PCI bus 66 which includes a PCI data/address bus 66A and a PCI control bus 66B. The South bridge 70 is coupled to the docking unit 54, hard drive 74, and input device 76 by the internal ISA bus 72 which includes an ISA data bus 72A, an ISA control bus 72B, and an ISA address bus 72C.

The transaction request generated by the processor 56 and placed on the PCI bus 66 by the North bridge 64 includes control signals transmitted on the PCI control bus 66B and a device address on the PCI data/address bus 66A. The control signals provide timing for processing transaction requests as well as an indication of the type (e.g., read or write request) of the transaction request.

The device address identifies which of the component devices 74, 76, 86, 88 is being requested by the transaction request. The South bridge 70 includes a controller 100 that continuously samples the PCI control bus 66B to determine when a transaction request has been placed on the PCI bus 66. In addition, the South bridge 70 includes an address latch 102 that receives from the PCI data/address bus 66A the device address of the component device being requested by the transaction request and latches the device address responsive to a trigger signal on line 104, as explained below. If none of the other component devices coupled to the PCI bus 66, such as the video controller/display screen 68, claims the transaction request after a predetermined period (e.g., 2 clock cycles), then the controller 100 claims the transaction request by asserting a device select control signal (DEVSEL#) on the PCI control bus 66B.

Upon claiming the transaction request, the controller 100 causes the transaction request to be transmitted to the internal ISA bus 72. As mentioned above, the controller 100 also transmits to the address latch 102 a trigger signal or line 104 that causes the address latch to latch the device address and output the address to a docking controller 106 and to the ISA address bus 72C. In addition, the controller 100 outputs to the ISA control bus 72B the appropriate control signals to indicate that the transaction request is being transmitted on the internal ISA bus 72. The controller 100 also determines from the control signals received from the PCI control bus 66B whether the transaction request is a read or a write request. If the transaction request is a write request, then the controller 100 transmits to a data transceiver 108 a write trigger signal 110 which causes the data transceiver to obtain the data being written from the PCI data/address bus 66A. As is known in the art, during such a write transaction, the data being written is transmitted on the PCI data/address bus 66A one clock cycle after the device address is removed from the PCI data/address bus 66A. The data transceiver 108 passes the retrieved data to the ISA data bus 72A such that the internal ISA bus 72 includes the entire transaction request. If the transaction request is a read request rather than a write request, then the data transceiver 108 does not need to transfer any data to the ISA data bus 72A.

While the transaction request is being transferred from the PCI bus 66 to the internal ISA bus 72, the docking controller 106 determines whether the component device being requested is available. The docking controller 106 includes a decoder 112 coupled to the address latch 102. The docking controller 106 also includes an ISA control register 114 that, for each component device coupled to the internal ISA bus 72 or the external ISA bus 78, provides an indication of whether the component device is part of the portable computing unit 52. In other words, the ISA control register 114 stores a first value (e.g., logic state "0") indicating that the hard drive 74 and the input device 76 are part of the portable computing unit 52 and a second value (e.g., logic state "1") indicating that the LAN connection 80 and the fax/modem 82 are not part of the portable computing unit 52. The decoder 112 and ISA control register 114 are each coupled to a first set of AND gates 116A–116D corresponding to the hard drive 74, input device 76, LAN connection 80, and fax/modem 82, respectively. The first set of AND gates 116A–116D is coupled to a second set of AND gates 118A–118D that are each coupled to an OR gate 120.

As discussed above, whenever the portable computing unit 52 is detached from the docking unit 54, the South bridge 70 receives an undocked signal from the docking detector 78. The docking controller 106 of the South bridge 70 includes an enabling AND gate 122 that receives the undocked signal from the detector 84. The docking controller also includes a control register 124 that transmits a transaction request enable signal to the enabling AND gate 122 to enable the docking controller 106. The control register 124 could be programmed to de-assert the global enable signal if it is desired to disable the functions of the docking controller 106. In response to receiving high values from the undocked signal and the enable signal, the enabling AND gate 122 outputs a logic state "1" value to an enabling input of each of the AND gates 118A–118D. As a result, each of the AND gates 118A–118D will output a logic state "1" value if the AND gate receives a logic state "1" input from the corresponding one of the AND gates 116A–116D.

When the controller 100 claims an transaction request from the PCI bus 66, the decoder 112 receives the device address from the address latch 102. Based on the device address, the decoder 112 outputs a logic state "1" to whichever one of the AND gates 116A–116D corresponds to the device address. For example, assuming that the AND gate 116D corresponds to the fax/modem 82 and the device address received from the address latch 102 indicates that the transaction request is directed to the fax/modem 82, then the decoder transmits a logic state "1" to the AND gate 116D. The ISA control register 114 has been programmed to output a logic state "1" to the AND gate 116D because the fax/modem 82 corresponding to the AND gate 116D is not part of the portable computing unit 52. As a result, the AND gate 116D outputs a logic state "1" to the AND gate 118D. If the AND gate 122 has received a enable signal from the control register 124 and the undocked signal from the detector 84, then both inputs to the AND gate 118D will be logic state "1." As a result, the AND gate 118D will output a logic state one to the OR gate 120 which will cause the OR gate 120 to output a logic state "1." The logic state "1" output of the OR gate 120 is transmitted to the controller 100 to indicate that the component device being requested in the transaction request is unavailable because the portable computing unit has been detached from the docking unit 54. In response, the controller 100 terminates the requested transaction by transmitting a STOP# control signal on the PCI control bus 66B and de-asserting the device select signal DEVSEL#.

In addition to transmitting the logic state one to the controller 100, the OR gate 120 transmits the logic state "1" to an inverter 126 which outputs a system management interrupt signal SMI# (active low) to the processor 56. The SMI# signal causes the processor 56 to enter system management mode as discussed above. The error handling instructions in the system management memory 90 preferably indicate to the application program that caused the processor 56 to issue the transaction request that the requested device is unavailable.

It will be appreciated that the structure of the South bridge 70 can be modified without departing from the present invention. For example, the logic gates 116A–122 and 126 can be implemented using hardware or software. In addition, the decoder 112 could be designed to decode the addresses of only the component devices 74, 76 that are part of the portable computing unit. If the decoder received a device address of a component device that is known not to be part of the portable computing unit 52, then the decoder 112 could assume that the component device is coupled to the docking unit 54. Those skilled in the art will understand that the docking controller 106 could be structured in many other ways without departing from its ability to cause the controller 100 to terminate a transaction early if the transaction request is directed to a component device coupled to the docking unit 54 from which the portable computing unit 52 has been disconnected.

It also will be appreciated that numerous docking detectors other than the docking detector 78 shown in FIG. 2 can be employed. In particular, an alternate docking detector could transmit to the South bridge 70 a high or logic state one docking signal when the portable computer unit 52 is coupled to the docking unit 54 rather than a logic state zero like the docking detector 76. In addition, an alternate docking detector could be located in the docking unit 54 rather than in the portable computing unit 52. These alternate designs would be simply to design in view of the foregoing discussions and are considered well within the scope of the invention.

Based upon the foregoing discussion, it will be appreciated that the preferred embodiment of the present invention more efficiently processes requests for access to computer devices that are not currently connected to a portable computing unit. The preferred embodiment greatly reduces the time needed to terminate an transaction request for such an unavailable device compared to prior art computer systems. As a result the preferred embodiment resumes normal program execution more quickly after such requests for access to unavailable devices.

It should be understood that even though numerous advantages of the present invention have been set forth in the foregoing description, the above disclosure is illustrative only. Changes may be made in detail and yet remain within the broad principles of the present invention.

I claim:

1. A computer system, comprising:
   a target device that performs a requested computer function in response to receiving a request for access to the target device;
   a docking unit coupled to the target device; and
   a portable computing unit releasably coupled to the docking unit, the portable computing unit including:
      a processor structured to issue a request for access to the target device;
      a detector that detects whether the portable computing unit is coupled to the docking unit and transmits a docking status signal indicative thereof; and
      a bridge coupled to the processor and the detector, the bridge being structured to use the docking status signal to determine whether or not to transmit to the target device the request for access to the target device.

2. The computer system of claim 1 wherein the portable computing unit further includes:
   an ISA bus that releasably couples the docking unit to the bridge, wherein in response to determining that the target device currently is coupled by the ISA bus to the bridge, the bridge transmits the request on the ISA bus.

3. The computer system of claim 1 wherein the portable computing unit further includes:
   a first computer bus coupling the bridge to the processor, the processor transmitting the request on the first computer bus to the bridge; and
   a second computer bus coupled to the bridge and releasably coupled to the docking unit, wherein the bridge transmits the request on the second computer bus if the portable computing unit is coupled to the docking unit.

4. The computer system of claim 1 wherein the bridge is a first bridge, the computer system further including a second bridge coupled to the first bridge by a first computer bus and to the processor by a second computer bus, wherein the first bridge is structured to transmit a transaction termination signal on the first computer bus to the second bridge in the event the detector generates a docking status signal indicative of the portable computing unit not being coupled to the docking unit, the transaction termination signal causing the second bridge to terminate a transaction being requested by the request.

5. The computer system of claim 1 wherein the detector includes a resistive element coupled between a power source and the bridge, the resistive element also being releasably coupled to a ground in the docking unit such that, when the portable computing unit is detached from the docking unit, the resistive element is also detached from the docking unit ground which causes power from the power source to be directed to the bridge, the power directed to the bridge being the undocked signal.

6. The computer system of claim 1, further including:
   a system management memory that stores error handling instructions that the processor implements in response to a request for access to the target device and a docking status signal indicative of the portable computing unit not being coupled to the docking unit.

7. The computer system of claim 1, further including:
   a computer bus coupling the bridge to the processor; and
   one or more computer devices coupled to the computer bus wherein the bridge includes subtractive decode means for transmitting a subtractive decode to the processor if none of the computer devices coupled to the computer bus claims the request within a predetermined time period.

8. A computer system, comprising:
a target device that performs a requested computer function in response to receiving a request for access to the target device;
a docking unit coupled to the target device; and
a portable computing unit releasably coupled to the docking unit, the portable computing unit including:
   a processor structured to issue a request for access to the target device; and
   a bridge coupled to the processor, the bridge being structured to receive a docking status signal indicating whether the portable computing unit currently is coupled to the docking unit, use the docking status signal to determine whether the target device currently is coupled to the bridge and issue a request for access to the target device responsive to receiving a request from the processor for access to the target device only if the docking status signal indicates the portable computing unit is currently coupled to the docking unit.

9. The computer system of claim 8 wherein the portable computing unit includes a docking detector that transmits an undocked signal as the docking status signal to the bridge when the portable computing unit is not coupled to the docking unit and does not transmit the undocked signal when the portable computing unit is coupled to the docking unit.

10. The computer system of claim 8 wherein the portable computing unit further includes:
an ISA bus that releasably couples the docking unit to the bridge, wherein in response to determining that the target device currently is coupled by the ISA bus to the bridge, the bridge transmits the request on the ISA bus.

11. The computer system of claim 8 wherein the portable computing unit further includes:
   a first computer bus coupling the bridge to the processor, the processor transmitting the request on the first computer bus to the bridge; and
   a second computer bus coupled to the bridge and releasably coupled to the docking unit, wherein the bridge transmits the request on the second computer bus if the portable computing unit is coupled to the docking unit.

12. The computer system of claim 11 wherein the bridge is a first bridge, the computer system further including a second bridge coupled to the first bridge by a first computer bus and to the processor by a second computer bus, wherein the first bridge is structured to transmit a transaction termination signal on the first computer bus to the second bridge in the event the docking status signal indicates that the portable computing unit is not coupled to the docking unit, the transaction termination signal causing the second bridge to terminate a transaction being requested by the request.

13. The computer system of claim 8, further including:
a system management memory that stores error handling instructions that the processor implements in response to a request for access to the target device and a docking status signal indicative of the portable computing unit not being coupled to the docking unit.

14. A portable computing unit for processing a transaction request intended for a target device that may be coupled to the portable computing unit, the transaction request being a request for the target device to execute a transaction, the portable computing unit comprising:
   a processor coupled to the input device, the processor being structured to transmit the transaction request;
   a bridge coupled to the processor, the bridge including:
      a memory that stores an indication of whether the target device is internal to the portable computing unit; and
      a docking controller structured to receive a transaction request from the processor and a docking status signal that indicates whether the portable computing unit is detached from a docking unit and determine from the docking status signal and the memory whether the target device currently is coupled to the bridge and, if the target device is not currently coupled to the bridge, inhibit the bridge from issuing a transaction request to the target device responsive to the transaction request from the processor.

15. The portable computing unit of claim 14 wherein the target device is coupled to a docking unit to which the portable computing unit is releasably coupled.

16. The portable computing unit of claim 15, further comprising:
a detector that detects whether the portable computing unit currently is coupled to the docking unit and, if not, transmits to the bridge the docking signal at a logic state indicating that the portable computing unit currently is not coupled to the docking unit.

17. The portable computing unit of claim 14, further including:
a system management memory that stores error handling instructions that the processor implements in response to a transaction request directed to a target device and a docking status signal indicating that the target device to which the transaction request is directed is not connected to the portable computing unit.

18. The portable computing unit of claim 14 wherein the bridge is a first bridge coupled to a second bridge by a first computer bus, wherein the first bridge is structured to transmit a transaction termination signal on the first computer bus to the second bridge responsive to a docking status signal indicating that a target device to which a transaction request is directed is not coupled to the portable computing unit, the transaction termination signal causing the second bridge to terminate the transaction being requested by the transaction request.

19. A computer bridge for use in a portable computing unit and for processing a transaction request intended for a target device that may be releasably coupled to the portable computing unit, the transaction request being a request for the target device to execute a transaction, the computer bridge comprising:
   a memory that stores an indication of whether the target device is internal to the portable computing unit; and
   a docking controller structured to receive a transaction request from the processor and a docking status signal that indicates whether the portable computing unit is detached from the target device and determine from the docking status signal and the memory whether the target device currently is coupled to the bridge and inhibit the computer bridge from issuing a transaction request to the target device responsive to the target device to which the transaction request is directed not currently being coupled to the bridge.

20. The computer bridge of claim 19 wherein the docking controller includes the memory.

21. The computer bridge of claim 19, further including a transaction controller coupled to the docking controller, the docking controller transmitting to the transaction controller a device-detached signal indicating that the target device is not currently coupled to the bridge, the transaction controller transmitting an interrupt signal to the processor in response to the device-detached signal and a transaction request to a target device that is not internal to the portable coupling unit, the interrupt signal terminating the transaction.

22. A method for processing a transaction request intended for a target device coupled to a docking unit, the transaction request being a request for the target device to execute a transaction, the method being implemented by a portable computing unit having a processor, the method comprising:
   storing an indication of whether the target device is internal to the portable computing unit;
   receiving a docking status signal indicating whether the portable computing unit has been detached from the docking unit;
   in response to receiving the transaction request, determining from the stored indication and the docking status signal whether the target device currently is coupled to the portable computing unit; and
   if the target device currently is not coupled to the portable computing unit, terminating the transaction request directed to the target device.

23. The method of claim 22 wherein the portable computing unit includes an ISA bus that releasably couples the portable computing unit to the docking unit, the method further comprising:
   in response to determining that the target device currently is not coupled to the portable computing unit, terminating the transaction without placing the transaction request on the ISA bus.

24. The method of claim 22, terminating the transaction request includes:
   transmitting a system management interrupt signal to the processor in response to determining that the target device currently is not coupled to the portable computing unit, the system management interrupt signal causing the processor to execute error handling instructions.

25. The method of claim 24 wherein an application program caused the processor to issue the transaction request and the executing step includes notifying the application program that the target device currently is not coupled to the portable computing unit.

26. The method of claim 22 wherein the determining step is performing by a first bridge in the portable computing unit the method further comprising:
   transmitting an error signal from the first bridge to a second bridge in the portable computing unit; and
   terminating the transaction request in the second bridge in response to receiving the error signal.

27. A method for processing a transaction request from a portable computing unit to a target device coupled to a docking unit, the transaction request being a request for the target device to execute a transaction, the method comprising:
   storing an indication of whether the target device is internal to the portable computing unit;
   detecting whether the portable computing unit has been detached from the docking unit;
   transmitting to a bridge in the portable computing unit a transaction request directed to the target device;
   in response to receiving the transaction request, determining from the stored indication and the detecting step whether the target device currently is coupled to the portable computing unit; and
   in response to determining that the target device currently is not coupled to the portable computing unit, terminating the transaction request at the bridge without attempting to forward the transaction request to the target device.

28. The method of claim 27, further including:
   transmitting a system management interrupt signal to a processor in the portable computing unit in response to determining that the target device currently is not coupled to the portable computing unit the system management interrupt signal causing the processor to execute error handling instructions.

29. The method of claim 28 wherein an application program caused the processor to issue the transaction request and the executing step includes notifying the application program that the target device currently is not coupled to the portable computing unit.

30. The method of claim 27 wherein the bridge is a first bridge coupled to a second bridge in the portable computing unit, the method further comprising:
   transmitting an error signal from the first bridge to a second bridge in the portable computing unit; and
   terminating the transaction request in the second bridge in response to receiving the error signal.

31. The method of claim 27 wherein the detecting step is performed by a detector, the method further comprising:
   transmitting from the detector to the bridge a docking signal at a first logic state if the portable computing unit currently is coupled to the docking unit; and
   transmitting from the detector to the bridge the docking signal at a second logic state if the portable computing unit currently is not coupled to the docking unit.

32. A computer system, comprising:
   a docking unit having a docking unit connector;
   a docking unit target device coupled to the docking unit connector, the docking unit target device being structured to claim a transaction request directed to the docking unit target device; and
   a portable computing unit comprising:
      a computer system connector adapted to releasably connect to the docking unit connector;
      a computer system bus coupled to the computer system connector;
      at least one computer system target device coupled to the computer system bus, the computer system target device being structured to claim a transaction request directed to the computer system target device;
      a processor structured to issue a request for access to the computer system target device and the docking unit target device; and
      a bus bridge coupled to the processor and the computer system bus, the bus bridge receiving docking status information indicative of whether the portable computing unit is coupled to the docking unit, the bus bridge being structured to respond to a request for access from the processor by issuing a transaction request to the computer system bus and waiting for one of the computer system target device or the docking unit target device to claim the transaction request, the bus bridge being inhibited from issuing or completing a transaction request to the docking unit target device responsive to docking status information indicating that the portable computing unit is not coupled to the docking unit.

33. The computer system of claim 32, wherein the bus bridge comprises:
   a first bus bridge coupled to the processor and a peripheral bus, the peripheral bus being coupled to a first computer system target device; and
   a second bus bridge coupled to the peripheral bus and the computer system bus, the computer system bus being coupled to a second computer system target device and to the computer system connector.

34. The computer system of claim 33, wherein the first bus bridge comprises a CPU/PCI bus bridge, the peripheral bus comprises a PCI bus, the second bus bridge comprises a PCI/ISA bus bridge, and the computer system bus comprises an ISA bus.

35. The computer system of claim 33, wherein the first bus bridge is structured to respond to a request for access from the processor by issuing a transaction request to the peripheral bus and waiting for either the first computer system target device or the second bus bridge to claim the transaction request, and wherein the second bus bridge is structured to claim the transaction request and apply the transaction request to the docking unit target device if the transaction request is directed to the docking unit target device.

36. The computer system of claim 35, wherein the second bus bridge is inhibited from issuing the transaction request to the docking unit target device responsive to docking status information indicating that the portable computing unit is not coupled to the docking unit.

37. In a computer system including a portable computer and a docking station in which the portable computer contains a processor and may contain a target device, and the docking station may contain a target device, a method of processing a transaction request issued by the processor, the method comprising:

in response to the processor issuing a transaction request to a target device, determining if the target device to which the transaction request is directed is a part of the portable computer;

if the target device to which the transaction request is directed is a part of the portable computer, issuing the transaction request to the target device and waiting for the target device in the portable computer to claim the transaction;

if the target device to which the transaction request is directed is not a part of the portable computer, determining if the docking station is coupled to the portable computer;

if the docking station is coupled to the portable computer, issuing the transaction request to the target device and waiting for the target device in the docking station to claim the transaction; and if the docking station is not coupled to the portable computer, inhibiting or terminating the transaction request to the target device without waiting for a target device to claim the transaction.

38. The method of claim 37, wherein the act of terminating the transaction request further comprises applying an interrupt to the processor.

39. The method of claim 38, wherein the interrupt comprises a system management interrupt of the processor.

40. The method of claim 37, wherein the acts of issuing the transaction request to the target devices in the portable computer and in the docking device and the act of terminating the transaction request comprise:

issuing a transaction request directly to the target device if the transaction request is directed to a target device in the portable computer, and issuing a transaction request to a bus bridge if the transaction request is directed to a target device coupled to the docking station;

waiting for the target device in the portable computer to claim the transaction if the transaction request is directed to a target device in the portable computer;

waiting for the bus bridge to claim the transaction if the transaction request is directed to a target device coupled to the docking station and the docking station is coupled to the portable computer; and waiting for the bus bridge to terminate the transaction if the transaction request is directed to a target device coupled to the docking station and the docking station is not coupled to the portable computer.

41. The method of claim 37, wherein the transaction requests to the target device in the portable computer and the transaction requests to the target device coupled to the docking device are issued through a CPU/PCI bus bridge.

42. The method of claim 37, wherein the act of inhibiting or terminating the transaction request to the target device comprises preventing the transaction request from being issued.

43. The method of claim 37, wherein the act of inhibiting or terminating the transaction request to the target device comprises issuing the transaction request to the target device and then terminating the transaction request prior to the lapse of the normal time-out period of a transaction request.

* * * * *